(12) United States Patent
Kremer et al.

(10) Patent No.: US 7,926,637 B2
(45) Date of Patent: Apr. 19, 2011

(54) DEVICE FOR DAMPING VIBRATIONS, IN PARTICULAR, TORSION VIBRATION DAMPER

(75) Inventors: Eugen Kremer, Buehl (DE); Laurent Ineichen, Strasbourg (FR); Christian Huegel, Rheinau (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 720 days.

(21) Appl. No.: 11/974,792

(22) Filed: Oct. 16, 2007

(65) Prior Publication Data
US 2008/0087516 A1  Apr. 17, 2008

(30) Foreign Application Priority Data

Oct. 16, 2006 (DE) .......................... 10 2006 048 809

(51) Int. Cl.
*F16D 3/12* (2006.01)
(52) U.S. Cl. ......... 192/208; 192/30 V; 192/54.3; 464/24
(58) Field of Classification Search .................. 192/202, 192/206, 208; 464/26; 74/574.4
See application file for complete search history.

(56) References Cited

U.S. PATENT DOCUMENTS

| | | | | |
|---|---|---|---|---|
| 4,261,213 A | * | 4/1981 | Rattunde | 192/54.3 |
| 4,734,080 A | * | 3/1988 | Kronert | 464/26 |
| 5,669,354 A | | 9/1997 | Morris | |
| 2003/0178757 A1 | | 9/2003 | Rohs et al. | |

FOREIGN PATENT DOCUMENTS

| | | |
|---|---|---|
| DE | 100 17 688 A1 | 10/2001 |
| DE | 697 24 691 T2 | 7/2004 |

* cited by examiner

*Primary Examiner* — Rodney H Bonck
(74) *Attorney, Agent, or Firm* — Davidson, Davidson & Kappel, LLC

(57) ABSTRACT

A device for damping vibrations, in particular a torsion vibration damper with a primary component and a secondary component, coupled together through a torque transfer device and a damping coupling device. The torque coupling device includes a ramp mechanism for converting a rotation of one of the two elements, primary component or secondary component, into an axial force proportional to the input moment, which acts upon the other element. A device for compensating the resulting axial forces for generating an opposing force, opposing the resulting axial force, wherein the input moment is designed for a mean input torque. A conversion device is also provided, which directly converts an occurring force difference between the resulting axial force and the opposite force into a control variable for operating an actuation device in the device for damping vibrations, whereby an adaptation of the opposite force is performed.

10 Claims, 2 Drawing Sheets

DEVICE FOR DAMPING VIBRATIONS, IN PARTICULAR, TORSION VIBRATION DAMPER

This claims benefit of German Patent Application 10 2006 048 809.1, filed Oct. 16, 2006.

The invention relates to a device for damping vibrations, in particular to a torsion vibration damper.

BACKGROUND

Devices for damping vibrations for application in motor vehicles are known in a plurality of embodiments. In this context, a differentiation made between active and passive damping systems. Passive damping systems are most widely used. These are substantially comprised of a primary section and a secondary section in the form of flywheels, which are coupled amongst each other through a spring- and damping coupling. The spring- and damping coupling is thus created through spring units, wherein at least one circumferentially acting coil spring is provided. Among this group are also the so-called dual mass flywheels, wherein the two flywheel masses are supported on each other through a bearing. The application of this passive vibration insulation, however, is subject to certain restrictions. On the one hand, it is required that the damping element has as little stiffness as possible for achieving good vibration insulation, on the other hand, such a device operates like an elastic clutch, since it also has to transfer torque, wherein the transfer of large moments with a simultaneously restricted rotation angle between input and output requires a relatively stiff system. This contradicts the desired damping properties. It would therefore be advantageous to create a damping system with low stiffness for uneven rotations, and simultaneously with high stiffness, in order to be able to transfer the mean torque of the drive motor. For solving this problem, therefore, so-called active damping systems are proposed. These are being used in the area of suspensions for mechanisms and machinery. In an exemplary manner, the Patent document DE 69 724 691 is referred to in this context, wherein the drive motor is stabilized through a special control system in this embodiment. This, however, causes a direct function change at the drive motor, which is not desired for reasons of system modularity, and in order to avoid unpredictable dependencies with respect to the basic conditions, predetermined by components supplied by third party vendors.

Furthermore, mechanical solutions are known, which do not apply circumferentially acting coil springs, but an axial thrust is imparted through a respective ramp function from the one flywheel of the torsion vibration damper to the other flywheel, this means typically from the primary component to the secondary component. When an axially acting spring is used, the vibration energy can thus be stored in a preliminary manner. The generation of the axial thrust is performed through providing at least one lens shaped depression, extending in circumferential direction at least on one face side of one of the discs, which are also called ramps or double ramps, when they are symmetrically formed in both directions in circumferential direction. In such a double ramp, a roller element is disposed, which touches the front face of the respective adjacent disc, even at the deepest point of the double ramp. The roller element is typically provided as a ball. With this respect, reference is made to patent document DE 100 17 688 A1, among others. Thus, an axial thrust is generated through the relative rotation of the one disc relative to the other disc, which is converted into a torque again, after the imparted torque peak has subsided. Since the rotation is generally converted into an axial motion in ramp mechanisms, and a hydraulic pressure cavity is used for compensating the axial reaction and for transferring the torque, the compression pressure generally has to be controlled proportional to the mean input torque. Therefore it is required, however, to detect the input torque at the primary element and to filter it. From this variable, then the control variable for the pressure control or regulation, in particular of the compressing pressure towards at the secondary side, and thereby, the control variable for controlling or providing the pressure is formed. This control system requires a relatively complicated sensor system and electronic processing of the detected variable. Therefore the entire system is very complex.

SUMMARY OF THE INVENTION

An object of the invention provides refining a device for damping vibrations with an integrated ramp mechanism of the kine described above, so that the disadvantages are avoided, in particular, to implement an active damper with minor engineering and control efforts. A control system would be ideal, which does not require additional detection of certain actual values, and the required computation of target and control variables resulting from them.

The device for damping vibrations includes a primary component and a secondary component, which may be coupled amongst each other through torque transfer devices and through damping coupling means. The coupling for torque transfer may be performed through a ramp mechanism for converting a rotation caused by the induction of an input torque $M_{in}$ at one of the two elements, the primary element or the secondary element, into an axial force $F_{axial}$, proportional to the input moment, wherein the axial force that may be effective relative to the other element, the secondary element or the primary element, is converted into a torque to be transferred, wherein the torque is supported through a device generating an opposite force $F_{axial-opposing}$ at the other element, primary element or secondary element, which opposes the resulting axial force $F_{axial}$. The means are adjusted to a predefined mean input torque $M_{in-mean}$ to be transferred, so that there may be force equilibrium at the ramp mechanism, when this moment occurs. According to the invention a conversion device may be provided, converting an occurring force difference between the resulting axial force $F_{axial}$ and the opposing force $F_{axial-opposing}$ into a control variable Y for operating an adjustment device in the device for damping vibrations for changing the opposing force $F_{axial-opposing}$.

A solution according to the invention allows a direct adaptation of the required opposing force, depending on the size of the deviation from a mean input torque, for transferring the higher or lower input torque without the complex determination of the particular variables and processing in a control system.

Preferably, a force difference is directly converted into a distance s, or an angle at the conversion device. Thus the force difference may already causes a translatoric displacement of the particular ramp elements, so that in a particularly simple embodiment, this distance can be used directly as a control variable for controlling the adjustment device.

Preferably the control is performed in a purely hydraulic manner, this means without electronic data transfer. The hydraulic control device therefore includes a device for generating the opposing force $F_{axial-opposing}$ and an adjustment device for changing the opposing force, including an actuating element, coupled with the conversion device. The device for generating the opposing force $F_{axial-opposing}$ typically includes at least one piston element, and a pressure cavity, which can be filled with a pressure medium for loading the piston element, wherein the pressure cavity can be alternatively coupled through a switching device with a pressure medium source, or with a relief device, or alternatively only with a storage, not coupled with the relief device or the pressure medium source. Thus the storage may simultaneously functions as a device for damping coupling.

The actuation device in its simplest form may include a valve device, including at least three operating positions, the first operating position for coupling the pressure cavity with the storage, the second operating position for coupling the pressure cavity with a pressure medium source, and a third operating position for coupling the pressure cavity with a relief device. The valve device can thus be provided as a 3/3 way valve. For fine adjustment of the opposing force, this can preferably be operated continuously. Depending on the form of the piston surfaces and the strokes, the smoothness of the adjustment can be determined.

The system is thus in equilibrium in the mean area of the relative rotation angle, this means when the compressing force and the force resulting from the input moment, typically at the primary component, are equal in size. In this relative rotation angle range, the system is passive and torque may be transferred. Then there is neither a connection between the pressure chamber or the hydraulic storage and the tank, nor between the hydraulic storage and the pressure medium source. Thus, the pressure chamber operates as an elastic element together with the storage, in order to assure an insulation of the vibrations. In this case, the vibrations may be quasi extinguished through the storage.

When the input torque increases, an axial force is generated, which may be higher than the pressure force acting upon the secondary component in the pressure chamber. Consequently, the ramp and the piston move, so that the connection between the pressure chamber and the pressure medium source may be established. The compression pressure increases through the coupling with the pressure medium source, until the pressure equilibrium is reestablished. The system is passive again now. Analogously, the same processes occur, when the mean input torque decreases. In this case, the equilibrium may be reestablished through the connection between the pressure chamber and the tank as a relief device.

A solution according to the invention thus allows an adaptation of the pressure in the pressure- or compression chamber to the changed input torque, depending on the magnitude of the deviation from a mean input torque. Thus, the change directly functions as a control variable for the operation of a valve device.

There are numerous possibilities for a respective engineering design. Preferably, however, also here a high degree of component integration is selected. It is advantageous in particular, to integrate parts of the pressure chamber into the ramp element or into the secondary element. The same is true for the actuation device, in particular the valve device. In this case, a very compact design can be realized, and the particular required channels can be provided directly in the system in direct dependency, wherein a relative motion allows blocking or opening of these channel cross sections.

The valve device can be implemented in various manners. In the simplest case, these include at least three operating positions, and they are provided as a 3/3 way valve. This can be operable only in increments, this means between the particular operating positions, or also continuously between the particular operating conditions.

The conversion device is preferably formed by an element involved in the torque transfer, in particular a ramp element. Thus, preferably the second ramp element is selected, since here the axial force, and the opposing force directly become effective. The conversion device can thus also be formed by the secondary component, coupled torque proof with the ramp element, or by the ramp element, when it is provided as a secondary component.

According to a particularly advantageous embodiment, the valve device, the piston element, and the ramp element are integrated in the secondary component. In this embodiment, the system includes a so-called fixed ramp, this means it is fixed in place in axial direction, and forms the input and is typically formed by the primary element, as well as, a so-called distance ramp, forming the output, which is connected with the secondary component, preferably, torque proof, or forms it directly. Furthermore, the valve device and a storage are provided. Thus, for simplification, the piston of the valve device is provided as a travel ramp. The travel ramp is thus formed by a wall of the compression chamber, which can be moved in axial direction. In order to be able to transfer the torque, it is thus required that the secondary component is connected with the travel ramp in circumferential direction, in axial direction, however, it is provided movable relative to the secondary component.

BRIEF DESCRIPTION OF THE DRAWINGS

The invention is subsequently described with reference to figures. Therein the following is illustrated.

DETAILED DESCRIPTION

Figure 1:
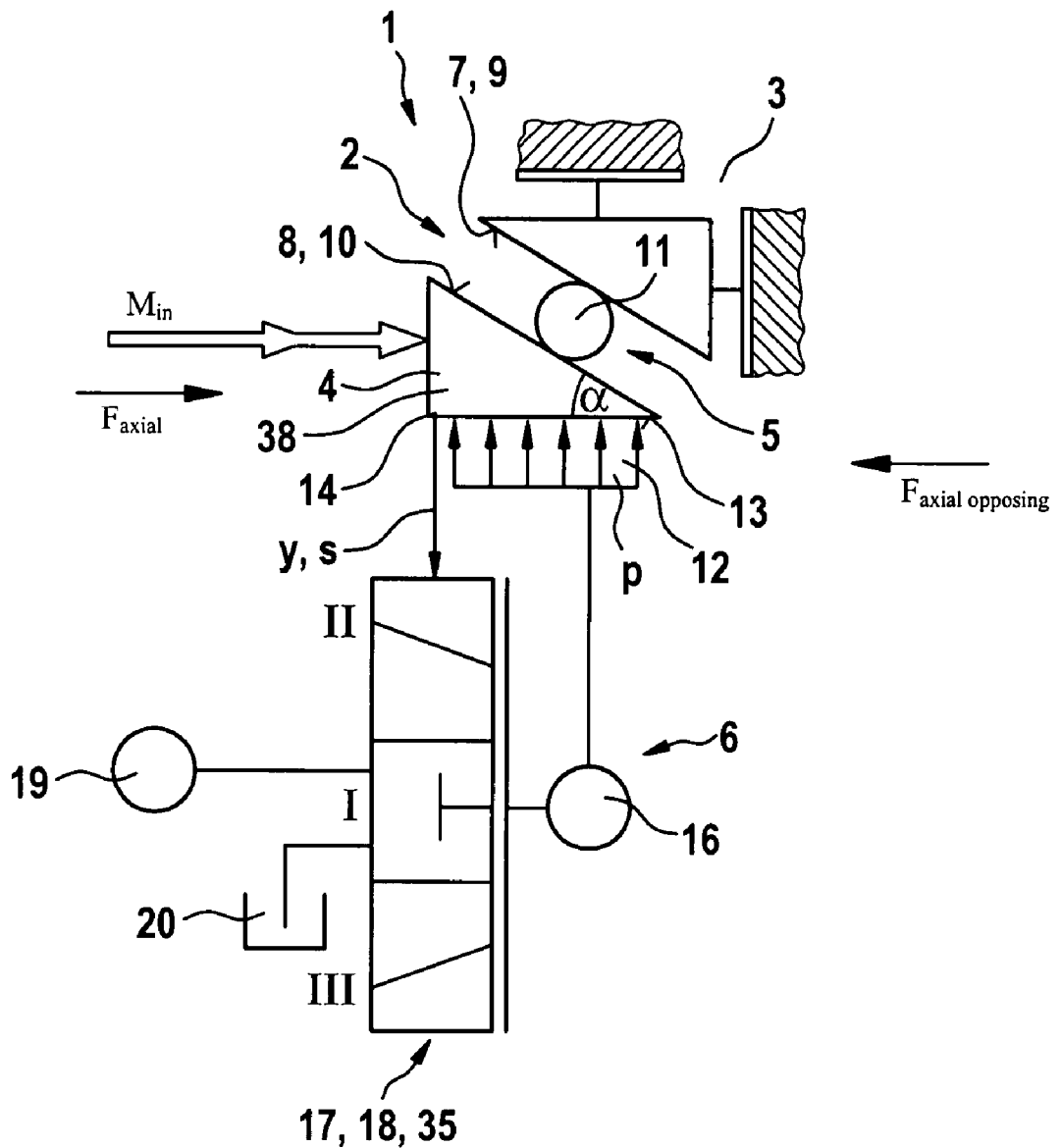
FIG. 1 illustrates the basic layout of a system according to the invention for active vibration damping in a simplified schematic depiction.

FIG. 1 illustrates the basic layout of a device 1 for damping vibrations with an integrated ramp mechanism 2 in a schematic simplified depiction. The device 1 comprises a primary component 3 and a secondary component 4, which are coupled through means 5 for torque transfer and furthermore through means 6 for damping coupling. Thus the ramp mechanism 2 comprises an input section and an output section, wherein these are either formed by the primary section 3, or the secondary section 4, depending on the force transmission device, or at least form a physical unit, this means they are coupled torque proof, with these elements as ramp elements. Typically, the primary part 3 and the secondary part 4 are provided as flywheels. At least one of the two flywheels, preferably both, or the ramp elements connected torque proof with them, have lens shaped indentations symmetrically extending in circumferential direction at the face sides 7 and 8, pointing toward each other, in which indentations at least one roller element 11 is disposed, preferably in the form of a ball, which is in contact, also at the deepest point of the lens shaped indentation, with the respective adjacent face surface 8 or 7 at the other component, the primary component 3 or the first ramp element, or the secondary component 4, or the second ramp element, or vice versa, and thus serves for torque transmission. The ramp elements are either the primary component 3, or the secondary component 4, or elements connected torque proof with them, on which the ramp surfaces 9, 10 are provided. The indentations are not shown here in detail. Only the ramp surfaces 9 and 10, which are created by them, and which are disposed in parallel with each other, and movable relative to each other in circumferential direction, are visible, which operate like slanted surfaces movable relative to each other. Since the primary component 3 is typically connected torque proof with the input side, and it is provided in axial direction without a possibility for axial translatoric movement, this means it is fixated in axial direction with respect to its position, a rotation of the primary component 3 in circumferential direction causes an axial thrust upon the secondary component 4, which is transferred through the roller elements 11. This axial thrust, which is caused by an axial force, $F_{axial}$, generated due to the imparted input torques $M_{in}$, is supported by an opposite force $F_{axial-opposing}$, so that a torque is transferred, depending on the magnitude of the opposing force. Ideally, an opposing force $F_{axial-opposing}$ is created, which corresponds to the axial force $F_{axial}$, which results from the mean input torque $M_{in}$, wherein, due to the force equilibrium, this mean input torque $M_{in}$ is then transferred through the roller elements 11. The generation of the opposing force $F_{axial-opposing}$ is performed by a hydraulic control device 15. It comprises a piston element 14, which is associated with the secondary component 4, or directly formed by it, and a pressure cavity 12. The piston element 14 is actuated through the pressure in the pressure cavity 12. The pressure cavity 12 can thus be loaded by a pressure medium. The secondary component 4, or the ramp element connected therewith, is loaded with a pressure p at its front face 13, facing away from the primary component 3 as a piston surface, generating the corresponding opposing force $F_{axial-opposing}$ with respect to the force $F_{axial}$, thus holding the system in equilibrium by supporting the secondary component 4 in axial direction. The opposing force $F_{axial-opposing}$, caused by the pressure p onto the piston surface, is thus provided, so that at least the mean input torque $M_{in-mean}$ is reliably transmitted through the device 1. In case of deviations from the mean input torque $M_{in-mean}$, compensation can be performed through pressure control in the pressure cavity 12. To avoid complex detections of the actual value of the mean input torque, $M_{in-mean}$, and to perform a respective control of the pressure p in the pressure cavity 12, there is a possibility to solve this from a design point of view by performing the control hydraulically. The hydraulic control device 15 comprises next to the pressure cavity 12, associated at least indirectly with the secondary component 4, or the second ramp element, a storage 16, coupled with the pressure cavity 12, and means 17 for selective coupling of the pressure medium storage with a pressure medium source 19, in particular a pressure ramp or a relief device 20, in particular, a pressure sink, e.g. provided as a tank, or in general for decoupling both. The means 17 thus comprise in the simplest case a valve assembly 18, comprising at least three operating positions, a first operating position I, in which the storage 16, or the pressure cavity 12 is decoupled from the pressure medium source 19 and the relief device 20, a second operating position II, in which the storage 16, or the pressure cavity 12 is connected with a pressure medium source 19, and a third operating position III, in which the storage 16 or the pressure cavity 12 is connected with a relief device 20. The means 12 thus function as actuation device 35 for adjusting the compression pressure in the pressure chamber 12 for creating the required opposing force $F_{axial-opposing}$.

The system is provided, so that for transferring a mean input torque $M_{in-mean}$ at the device 1 for damping vibrations, in particular, in the primary component 3, an opposite force $F_{axial-opposing}$ is provided, which opposes the resulting axial force $F_{axial}$, generated in the pressure cavity 12, relative to the piston element 14. In this case, the actuation device 35 is in the first operating position I. There is equilibrium and torque peaks can be compensated through the storage 16. When the mean input torque $M_{in-mean}$ to be transferred increases a higher opposing force is required for torque transfer. The pressure in the pressure chamber 12 has to be adapted. According to the invention this is not realized through complex control systems, but the force difference directly impacts the control variable Y for controlling the control device 35 through a conversion device 38. Preferably a conversion is performed into a variable, characterizing the change in position, as e.g. a travel distance or an angle. As a conversion device, an element, e.g. the second ramp element can function, which is subject to a translatoric motion due to the force difference.

In the simplest case, the force difference between the axial force $F_{axial}$, generated by the input torque $M_{in-mean}$, to be transferred, and the preset opposing force $F_{axial-opposing}$ is converted into a translatoric motion of an element, in particular, into a translatoric motion of the second ramp element, by a travel distance s, which is proportional or equal to the required stroke of the actuating element 35 of the valve device 18. Thus, the valve device 18 is actuated in the direction of the second operating position II, and the pressure source 19 is connected with the pressure cavity 12, when the mean torque $M_{in-mean}$ to be transferred increases. Analogously, a connection with the relief device 20 is performed, when the input torque $M_{in-mean}$ to be transferred is reduced. Depending on the embodiment, the change between the particular operating positions, I, II, III, is preferably performed continuously, so that through changing the free cross sections, a fine adjustment of the pressure in the pressure chamber 12 is possible.

Figure 2:
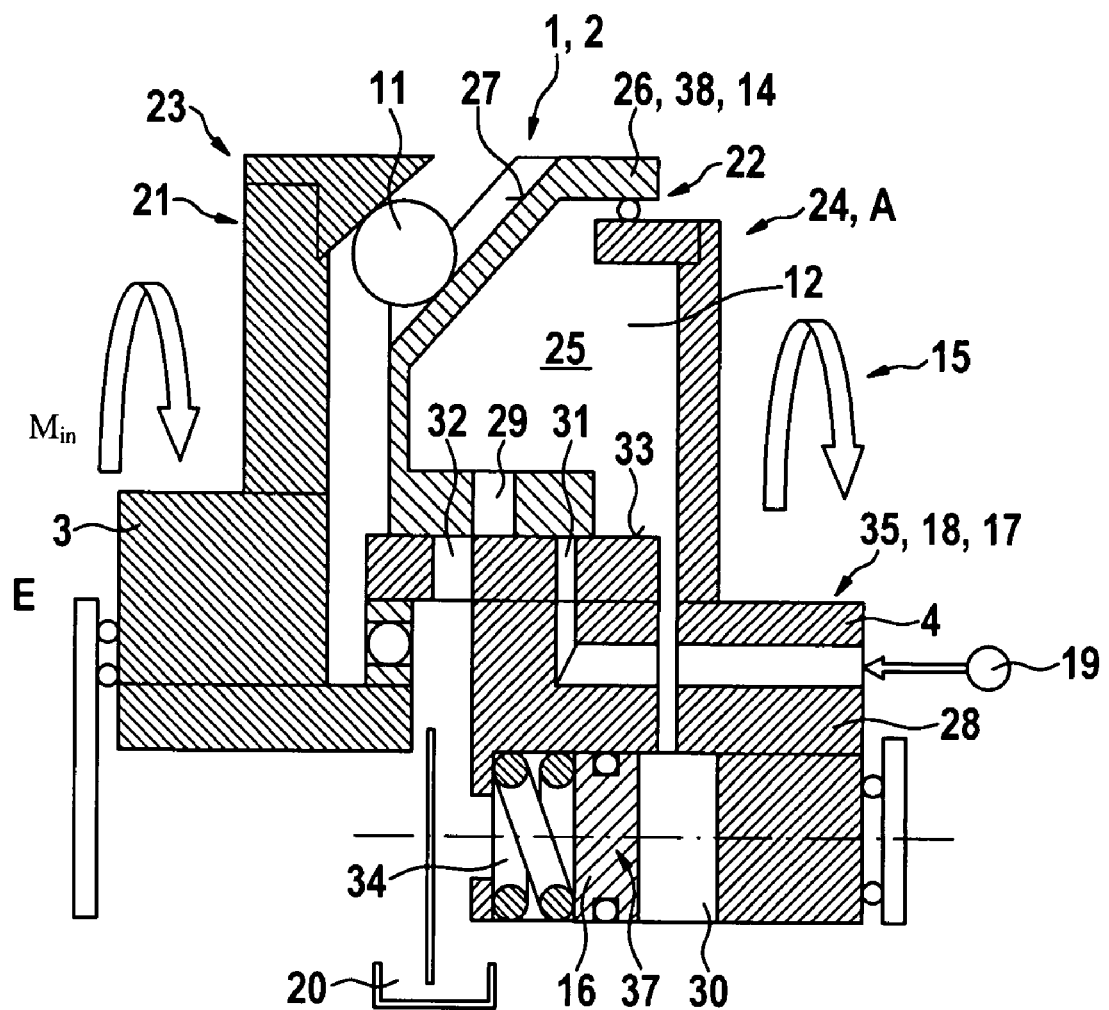
FIG. 2 illustrates a possible design implementation of an embodiment according to FIG. 1 in a simplified schematic depiction.

FIG. 2 illustrates a particularly advantageous engineering design of the integration of the hydraulic control device 15 according to the invention into a device 1 for damping vibrations in a simplified schematic depiction. This also comprises a primary part 3 and a secondary part 4, which are connected amongst each other through the ramp mechanism 2. The ramp mechanism 2 thus comprises at least two ramp elements, designated here with 21 and 22, wherein they are either connected torque proof with the primary component 3 and the secondary component 4, or they form the respective primary component 3, or the secondary component 4. Both possibilities are feasible. The primary component 3 and the secondary component 4 are typically provided as flywheels. They are provided as disc shaped elements. In the illustrated embodiment, only torque proof couplings are illustrated between the particular elements. Thus, the ramp element 21 forms a so-called fixed ramp 23 with the primary component 3. The secondary component 4 forms the so-called travel ramp 24 with the second ramp element 22. The fixed ramp 23 forms the input E, and the travel ramp 24 forms the output A of the ramp mechanism 2. Also here, a physical unit of the secondary component 4 and the ramp element 22, or an integral design is feasible. The coupling for torque transfer is performed through the roller elements 11, which are provided in indentations at the respective ramp elements 21 and 22.

FIG. 2 illustrates a particularly advantageous embodiment, in which the hydraulic control device 15 is integrated in the secondary component 4, in particular in the travel ramp 24. The hydraulic control device 15 comprises a pressure chamber provided as the compression chamber 25, impacting a piston element, coupled with the second ramp element 22, and movable relative to it, or forming the second ramp element 22 according to a particularly advantageous embodiment. In this case the piston element 26 is used for forming the compression chamber 25. The piston element 26 is therefore guided at the secondary component 4 in a sealing and axially translatoric manner. The piston element 26 comprises a piston surface 27 which operates together with the roller element 11, wherein a support at the secondary component 4 is performed through it. The positioning device 35 in the form of a valve assembly 18 is integrated in the secondary component 4, or in the travel ramp 24, through which the compression chamber 25 can be selectively coupled with a pressure medium souce 19, or a relief device 20, or it is decoupled from both. The piston element 26 thus has a pass-through opening 29, which can be selectively coupled with the particular connections at the secondary component 4 or the fixed ramp 24, forming the valve assembly 18. The coupling is thus performed depending on the position of the piston element 26 in axial direction, relative to the secondary component 4. The piston element 26 is thus provided axially movable at the secondary component 4 for this purpose. At the secondary component 4 radially facing connections 30 through 32 are provided, which are used for coupling with the compression chamber 25. The secondary component 4 is thus provided as a cylindrical element 28, through whose walls the channels for the connections 30 to 32 extend up to the outer circumference 33. Through the pass-through opening 29, which is also preferably provided in radial direction in the wall of the piston element 26, defining the compression chamber 25, the connection with the compression chamber 25 can be generated. The compression chamber 25 and the actuating device 35 are preferably provided coaxial with each other. The particular connections with the pressure source 19, or the relief device 20 are created through establishing flush positioning or overlapping positioning between the particular connections 30 through 32 and the pass-through opening 29. In the shown embodiment the connection 31 can be coupled with the pressure medium source 19 and the connection 32 can be coupled with the relief device 20. The connector 30 can be connected with a hydraulic storage 16, wherein the storage 16 comprises a piston element 37, supported at a spring unit 34, wherein the piston element 37 is loaded by the pressure in the compression chamber 25. According to FIG. 2, the coupling of the pressure chamber 12 with the other connections is always performed through the storage 16.

The system is designed, so that for the transfer of a mean input torque $M_{in\text{-}mean}$ at the device 1 for damping vibrations, in particular in the primary component 3, relative to the resulting axial force $F_{axial}$, an opposing force $F_{axial\text{-}opposing}$ is provided, which is generated relative to the piston element 26 in the compression chamber 25, wherein the particular connections 31 and 32 are not connected to the compression chamber 25 in this position. Only a coupling between the compression chamber 25 and the storage 16 exists. This is realized through the first connection 30. The second connection 31 can be coupled with the source of the pressure means 19, while the third connection 32 can be connected with the relief device 20. Depending on the position of the piston element 26, the particular connections are more or less covered, which generates the particular functions of the valve device. The function of the valve piston of the valve device 18 is taken over by the piston 26 in this case, which simultaneously also generates the compression force relative to the second ramp element.

The solution according to the invention is not limited to the embodiment shown in FIG. 2. Any possibility of a direct conversion of a position change, caused by the difference between the axial force resulting from the input moment and the predefined opposing force is conceivable. In the simplest case the force difference is used, which is directly converted into a travel distance.

The integration of the travel ramp 24 into the secondary component 4 provides a particularly compact embodiment, which is characterized by a minimal design and control complexity. Furthermore, it is conceivable to connect the compression chamber with the compression volume of another unit, e.g. a continuously variable transmission, provided in the form of a CVT, which is disposed subsequent to the device for damping vibrations, and thus to integrate the function of a moment sensor into the damper right away.

| | Designations |
|---|---|
| 1 | device for damping vibrations |
| 2 | ramp mechanism |
| 3 | primary component |
| 4 | secondary component |
| 5 | torque transfer device |
| 6 | damping coupling device |
| 7 | front face |
| 8 | front face |
| 9 | ramp surface |
| 10 | ramp surface |
| 11 | roller element |
| 12 | pressure cavity |
| 13 | front face |
| 14 | piston surface |
| 15 | hydraulic control system |
| 16 | storage |
| 17 | selective coupling or decoupling to/from a pressure medium source, or a relief device |
| 18 | valve assembly |
| 19 | pressure medium source |
| 20 | relief device |
| 21 | fixed ramp |
| 22 | ravel ramp |
| 23 | compression chamber |
| 24 | piston element |
| 25 | piston surface |
| 26 | cylindrical element |
| 27 | pass-through opening |
| 28 | connection |
| 29 | connection |
| 30 | connection |
| 31 | outer circumference |
| 32 | spring unit |
| 33 | actuation device |
| 34 | actuator |
| 35 | piston |
| 38 | conversion device |

What is claimed is:

1. A device for damping vibrations comprising a torsion vibration damper with a primary component and a secondary component, coupled together through a torque transfer device and a damping coupling device, wherein the torque transfer device includes a ramp mechanism for converting a rotation caused by an induction of an input element at one of the primary component and the secondary component into an axial force $F_{axial}$ proportional to the input element, wherein the axial force acting upon the other one of the primary component and secondary component is converted into a torque to be transferred, wherein the torque is supported by a device generating an opposing force $F_{axial\text{-}opposing}$, opposing the axial force $F_{axial}$ at the other one of the primary component and secondary component, and wherein the torque is adjusted to a predefined mean input moment to be transferred; and a conversion device converting an occurring force difference between the axial force $F_{axial}$ and the opposing force $F_{axial\text{-}opposing}$ directly into a control variable Y for operating an actuation device in the device for damping vibrations for changing the opposing force $F_{axial\text{-}opposing}$.

2. The device for damping vibrations as recited in claim 1 wherein the force difference is converted at the conversion device into a travel distance s or an angle of displacement of the ramp mechanism.

3. The device for damping vibrations as recited in claim 1 wherein the secondary component further comprises a hydraulic control device including a device for generating the opposing force $F_{axia\text{-}opposing}$, and the actuation device for changing the opposing force, the actuation device comprising an actuator coupled with the conversion device.

4. The device for damping vibrations as recited in claim 3 wherein the device for generating the opposing force $F_{axail\text{-}opposing}$ includes at least one piston element and a fillable pressure cavity fillable with pressure medium for loading the piston element, the piston element being selectively coupled through the actuation device with a pressure medium source or with a relief device or only with a storage.

5. The device for damping vibrations as recited in claim 4 wherein the actuation device includes a valve device having at least three operating positions, a first operating position for coupling the pressure cavity with the storage, a second operating position for coupling the pressure cavity with the pressure medium source and a third operating position for coupling the pressure cavity with the relief device.

6. The device for damping vibrations as recited in claim 5 wherein the valve device is a 3/3 way valve, wherein a piston element of the valve device functions as the actuation device and the 3/3 way valve being operated continuously.

7. The device for damping vibrations as recited in claim 4 wherein the conversion device is integrated in the piston element.

8. The device for damping vibrations as recited in claim 4 wherein the damping coupling device includes the storage disposed coaxial with the pressure cavity.

9. The device for damping vibrations as recited in claim 1 wherein the conversion device is formed by a ramp element of the ramp mechanism.

10. The device for damping vibrations as recited in claim 9 wherein the conversion device is integrated in the secondary component or in the ramp element.

* * * * *